United States Patent [19]

Leclercq

[11] 3,892,883

[45] July 1, 1975

[54] PROCESS FOR PLASMA SPRAYING FIBER-REINFORCED THERMOSETTING RESIN LAMINATES

[75] Inventor: Gérard Leclercq, St-Medard en Jalles, France

[73] Assignee: Societe Europeene de Propulsion, Puteaux, France

[22] Filed: Jan. 19, 1973

[21] Appl. No.: 325,183

[52] U.S. Cl. ................ 427/34; 427/290; 29/195

[51] Int. Cl. ................................................ C23c 7/00

[58] Field of Search ........ 117/93.1 PF, 71 R, 105.2, 117/47 A, 70 A, 69

[56] References Cited

UNITED STATES PATENTS

| | | | |
|---|---|---|---|
| 2,924,537 | 2/1960 | Wallis et al. | 117/70 A |
| 3,179,531 | 4/1965 | Koubek | 117/70 A |
| 3,573,090 | 3/1971 | Peterson | 117/105.2 X |
| 3,640,757 | 2/1972 | Grubba | 117/105.2 X |

*Primary Examiner*—Cameron K. Weiffenbach
*Assistant Examiner*—John D. Smith

[57] ABSTRACT

Laminates coated with copper/glass, nickel aluminide and finally with a metal oxide or carbide have improved mechanical properties especially cohesion.

10 Claims, No Drawings

PROCESS FOR PLASMA SPRAYING FIBER-REINFORCED THERMOSETTING RESIN LAMINATES

The present invention relates to laminates coated with metal carbides or oxides and to their preparation.

Attempts have been made to produce deposits of metal carbides on laminates, but the coatings produced do not adhere effectively to the laminate, mainly because the intermediate layers on the laminate, and more particularly the first intermediate layer which contacts the laminate itself, do not adhere satisfactorily to the laminate.

The present invention provides laminates coated with metal carbides or oxides which possess similar surface characteristics to metals, while also displaying some of the well-known and desirable properties of laminates.

The laminates of the invention are provided with a coherent composite protective coating comprising a first layer of copper/glass adherent to the laminate surface, a second layer of nickel aluminide, and an outer layer of a metal carbide or oxide. These coated laminates are made by cleaning the surface of the laminate to be covered to remove all impurities or dust particles, depositing thereon a first thin intermediate layer of copper/glass, depositing on the said first layer a second thin layer of nickel aluminide and depositing on said second layer an outer layer of carbide or oxide. The term "laminate" is used herein to refer to multi layer structures bonded together with a natural or synthetic resin, usually a cured synthetic thermosetting resin such as an epoxy resin, in which each layer contains a fibrous reinforcement, e.g. of paper or glass or carbon fibre.

In the coated laminates of the present invention the various layers are very well bonded to one another and cannot be delaminated by impacts on the outer surface of metal carbide or oxide.

The laminate surface is preferably first cleaned with a solvent such as a ketone, e.g. methyl ethyl ketone, and then treated with an abrasive in such a way as to remove any foreign bodies from the laminate and to provide a key for the copper/glass layer. The surface thus prepared is finally blown with a dry oil-free gas. This treatment gives a laminate surface which is absolutely free from foreign bodies such as metal particles or dust particles which could adversely affect the adhesion of the intermediate layer to the laminate.

The abrasive used in cleaning the laminate is preferably corundum particles, projected at the laminate surface at an angle of 30° to avoid inclusions of corundum in the laminate fibres. This treatment with corundum can be carried out with sandblasting equipment, using so-called single-use sand or sand which has been regenerated in such a way that it does not contain any metal or other particles capable of contaminating the laminate.

When this preparatory stage is complete, the laminate is treated with a dry, oil-free gas such as argon or other unreactive gas to remove all the dust particles.

A first thin layer of a mixture of copper and glass, generally containing 75% copper and 25% glass, is then deposited by spraying, preferably plasma spraying using a blowpipe onto the perfectly clean laminate, preferably to a thickness of about 0.02 cm. This first intermediate layer adheres perfectly to the laminate because of its composition. A second thin intermediate layer, preferably about 0.03 cm. thick, and consisting of nickel aluminide generally having a composition of 80% nickel and 20% aluminium, is then deposited again preferably by plasma spraying. Appropriate powdered mixtures of copper and glass and of nickel and aluminium are commercially available from METCO under the trade marks XP1159 and 404NS respectively.

The outer layer of metal carbide or oxide is deposited in known manner using commercially available plasma spraying equipment.

The presence of the second intermediate layer makes it possible to carry out the deposition of the outer metal carbide or oxide layer under excellent conditions, since the second intermediate layer adheres perfectly to the first intermediate layer and the layer of metal carbide or oxide also adheres perfectly to the second intermediate layer.

During the depositions of the intermediate layers and of the metal carbide or oxide, the bare or covered laminate is cooled vigorously with one or more jets of oil-free dry air, so as to prevent any secondary reactions between the various components.

Experiments carried out with tungsten carbide or chromium carbide outer layers have shown that the finished product possesses good physical characteristics even when the metal carbide layer is as much as 1 mm. thick.

The coated laminates of the present invention have uses in, for example, aeronautics (leading edges of aerodynamic structures such as wings, helicopter rotors and jet engine compressor vanes) antennae (protection of radome), drawing rollers for synthetic filaments, especially those exposed to acid vapours as in rayon spinning and tools.

I claim:

1. A process for providing a fiber-reinforced thermosetting resin laminate with a protective coating, which process comprises cleaning the surface of the resin laminate to be coated with a solvent and then blasting the surface with an abrasive to remove foreign bodies, plasma spraying a layer of a mixture containing 75% copper and 25% glass on the cleaned and blasted surface, cooling the said copper/glass layer, plasma spraying a layer of nickel aluminide on the copper/glass layer, cooling the said nickel aluminide layer, and plasma spraying a layer of chromium carbide or tungsten carbide on the nickel aluminide layer.

2. Process according to claim 1 in which the said laminate comprises a plurality of fibrous layers bonded together with a cured epoxy resin.

3. A process according to claim 1 in which the blasting is grit blasting at an angle of 30°.

4. Process according to claim 1 in which the nickel aluminide layer comprises 80% nickel and 20% aluminium.

5. A process according to claim 1 wherein the thickness of the glass/copper layer is about 0.02 cm; the thickness of the nickel aluminide layer, about 0.05 cm; and the thickness of the carbide layer, about 0.2 cm.

6. A process according to claim 1 wherein the solvent is a ketone.

7. A process according to claim 1 wherein the solvent is methyl ethyl ketone.

8. A process according to claim 1 wherein the abrasive is corundum.

9. A process according to claim 1 wherein the resin laminate consists essentially of cured epoxy resin and a fibrous material.

10. A process according to claim 9 wherein the fibrous material is paper, glass, or carbon.

* * * * *